(12) United States Patent
Zimmanck (10) Patent No.: US 9,031,140 B2
(45) Date of Patent: May 12, 2015

(54) METHOD AND APPARATUS FOR TRANSMITTING COMBINED POWER, CONTROL AND DATA THROUGH AN ISOLATION BARRIER

(71) Applicant: Enphase Energy, Inc., Petaluma, CA (US)

(72) Inventor: Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 13/720,602

(22) Filed: Dec. 19, 2012

(65) Prior Publication Data

US 2013/0163686 A1    Jun. 27, 2013

Related U.S. Application Data

(60) Provisional application No. 61/579,462, filed on Dec. 22, 2011.

(51) Int. Cl.
*H04B 3/00* (2006.01)
*H04B 5/00* (2006.01)

(52) U.S. Cl.
CPC ............ *H04B 5/0025* (2013.01); *H04B 5/0031* (2013.01); *H04B 5/0037* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 2007/00; H04L 2025/00; H04L 2027/00; H04L 1/00; H04L 5/00; H04L 7/00; H04L 25/00; H04L 27/00; H04L 2001/00; H03M 5/00

See application file for complete search history.

(56) References Cited

U.S. PATENT DOCUMENTS

| 5,438,496 | A  | * | 8/1995 | Meur et al. ..................... 363/16 |
| 5,859,584 | A  |   | 1/1999 | Counsell et al. |
| 6,525,566 | B2 |   | 2/2003 | Haigh et al. |
| 2003/0091183 | A1 |   | 5/2003 | Holcombe et al. |
| 2006/0155908 | A1 |   | 7/2006 | Rotvold et al. |
| 2007/0035265 | A1 | * | 2/2007 | Balog et al. ................... 318/439 |
| 2011/0234293 | A1 |   | 9/2011 | Shanan |

OTHER PUBLICATIONS

International Search Report and Written Opinion mailed Apr. 12, 2013 for Application No. PCT/US2012/070318, 9 pgs.

\* cited by examiner

*Primary Examiner* — Adolf Dsouza
(74) *Attorney, Agent, or Firm* — Moser Taboada (57) ABSTRACT

Method and apparatus for transmitting combined power and data. In one embodiment, the apparatus comprises an isolation barrier; a drive controller for generating a first waveform comprising a plurality of data signals for transmitting different types of data, where the drive controller couples the first waveform to a first side of the isolation barrier to produce a second waveform on a second side of the isolation barrier; and a circuit controller coupled to the second side of the isolation barrier, where the circuit controller is powered by the second waveform, and where the circuit controller controls a circuit based on the plurality of data signals.

18 Claims, 6 Drawing Sheets

METHOD AND APPARATUS FOR TRANSMITTING COMBINED POWER, CONTROL AND DATA THROUGH AN ISOLATION BARRIER

CROSS-REFERENCE TO RELATED APPLICATIONS

This application claims benefit of U.S. provisional patent application Ser. No. 61/579,462, filed Dec. 22, 2011, which is herein incorporated in its entirety by reference.

BACKGROUND OF THE INVENTION

1. Field of the Invention

Embodiments of the present invention generally relate to power transmission techniques and, more particularly, to a method and apparatus for transmitting combined power, control and data through an isolation barrier.

2. Description of the Related Art

New power electronic topologies are emerging which require floating gate drives and control of Four Quadrant (4Q) switches. Switching devices such as 4Q switches may exist on the high-voltage side of some devices, such as power converters, and often the control electronics are on the low-voltage side. In such a topology, power needs to be transmitted from the low-voltage side across a safety barrier to drive the gates of the transistor switches, and data also needs to be transmitted from the low-voltage side across the safety barrier, for example to send the timing information for the switches and/or control information.

Galvanic isolation barriers provide such a safety barrier and represent the dividing line between the high-voltage and low-voltage sides of a circuit. Sending power and data across the barrier is difficult because there is a need to safely accept large voltage transients across the barrier, or circuit damage may occur. Allowing for power and data transfer over these barriers often involves using many advanced components which are expensive and have increased power consumption.

Therefore, there is a need in the art for a more efficient and simpler method and apparatus for transmitting a combination of power different types of data through an isolation barrier.

SUMMARY

Embodiments of the present invention relate to a method and apparatus for transmitting combined power and data. In one embodiment, the apparatus comprises an isolation barrier; a drive controller for generating a first waveform comprising a plurality of data signals for transmitting different types of data, wherein the gate drive controller couples the first waveform to a first side of the isolation barrier to produce a second waveform on a second side of the isolation barrier; and a circuit controller coupled to the second side of the isolation barrier, wherein the circuit controller is powered by the second waveform, and wherein the circuit controller controls a circuit based on the plurality of data signals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
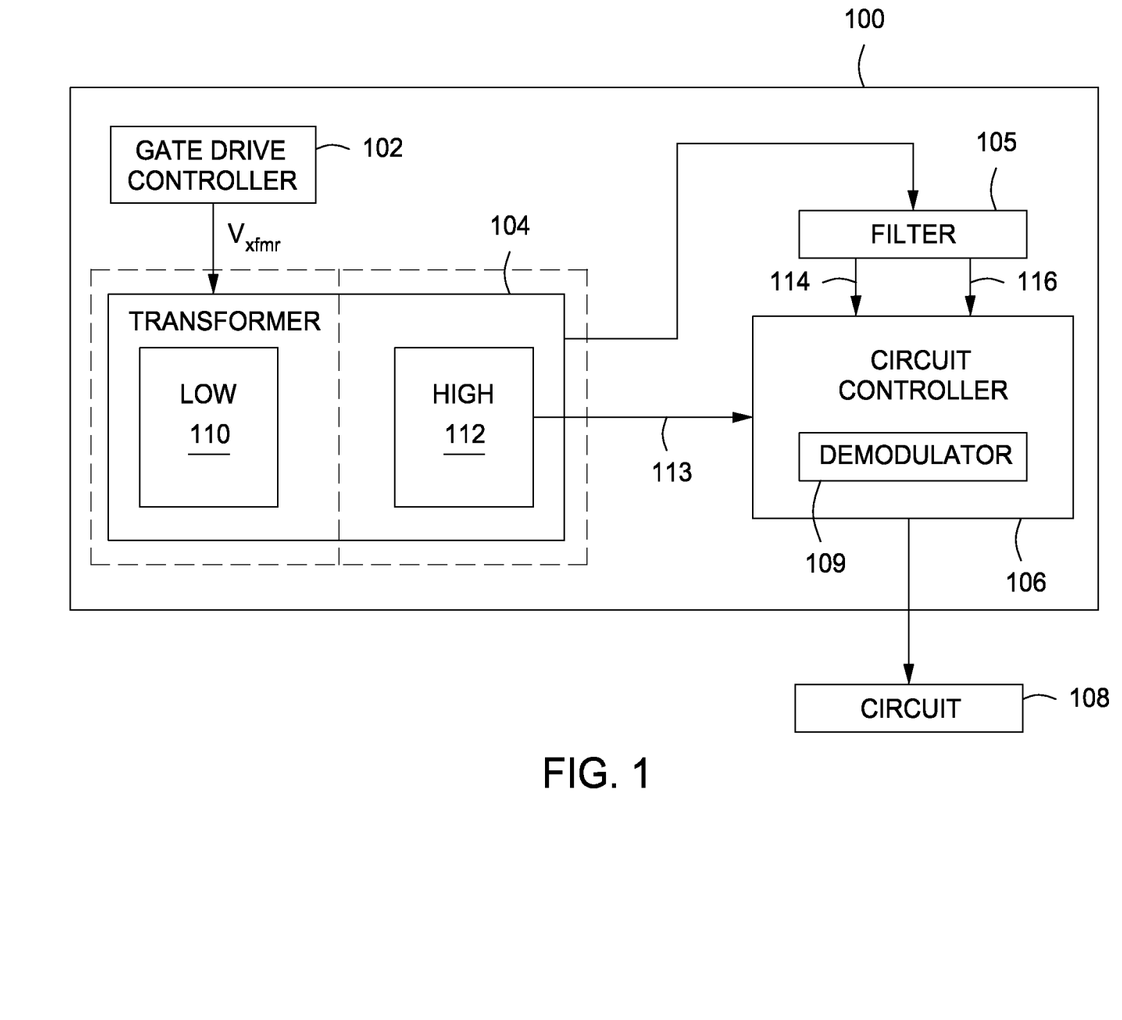
FIG. 1 is a functional block diagram of an apparatus for transmitting combined power, control and data through an isolation barrier in accordance with at least one embodiment of the invention.

FIG. 1 is a functional block diagram of an apparatus 100 for transmitting a combination of power and multiple data types through an isolation barrier in accordance with at least one embodiment of the invention. The apparatus 100 comprises a drive controller 102, an isolation barrier 104 for providing electrical isolation, a filter 105, and a circuit controller 106. The apparatus 100 is coupled to a circuit 108. According to an exemplary embodiment, the electrical isolation barrier 104 is an isolation transformer, referred to herein as transformer 104. In other embodiments, the electrical isolation barrier 104 is a different type of isolation barrier, such as a capacitive isolation barrier or the like.

The drive controller 102 couples a voltage drive signal to the transformer 104. The transformer 104 transforms the voltage drive signal from a low voltage side 110 (i.e., a primary side of the transformer 104) to a high-voltage side 112 (i.e., a secondary side of the transformer 104). The transformed voltage is coupled from the high-voltage side 112 of the transformer 104 to the filter 105, which in some embodiments may be a splitter. Additionally, a signal 113 is coupled from the high-voltage side 112 to the circuit controller 106 to provide power to the circuit controller 106.

The filter 105 filters the signal received from high-voltage side 112 into a first data signal 114 and a second data signal 116 and couples these to the circuit controller 106. The circuit controller 106 is further coupled to the circuit 108 for controlling the circuit 108.

The first and second data signals comprise different types of data for operating the circuit 108. In some embodiments, the first data signal 114 is a low-latency drive signal for the circuit 108 and the second data signal 116 contains data that is demodulated by a demodulator 109 of the circuit controller 106 and used, for example, to determine one or more operating modes of the circuit 108. According to an exemplary embodiment, the demodulator 109 is implemented as a counter, where the first data signal 114 is used to reset the counter as well as to provide timing data for driving one or more switches of the circuit 108, and the second data signal 116 is used to increment the counter for determining data to control the circuit 108. In such an embodiment, the rising edge of the first data signal 114 may provide timing to turn one or more switches on and when the first data signal 114 is off, the switches are turned off. The first data signal 114 may thus be a low-latency signal used as both a clock and a clock reset for the demodulator 109; in an exemplary embodiment, the first data signal 114 has a latency of 10-20 nanoseconds (ns).

The second data signal 116 contains data transmitted to operate the circuit 108, such as data that defines an operating mode for the circuit 108. The signal 116 may transmit n-bit data every clock cycle or over multiple clock cycles. For example, the signal 116 may be transmit a single data bit each clock cycle (e.g., a high-signal as a "1" and a low-signal as a "0"), where a single-bit character is sent every clock cycle or more complex, lower speed data is sent over multiple clock cycles. Alternatively, the signal 116 may transmit multiple data bits each clock cycle; e.g., a single pulse on the signal 116 during a clock cycle corresponds to the 2-bit character "00", two pulses during a clock cycle corresponds to the character "01", three pulses during a clock cycle corresponds to the character "10", and four pulses during a clock cycle corresponds to the character "11". Although more complex data requires a more complex demodulator 109, a separate clocking circuit is still not required as every pulse of the signal 116 increments the counter and every pulse of the signal 114 resets the counter, enabling a self-clocked circuit. Thus, the drive controller 102 communicates a plurality of different types of data (e.g., timing and control) across the isolation barrier of the transformer 104.

Figure 2:
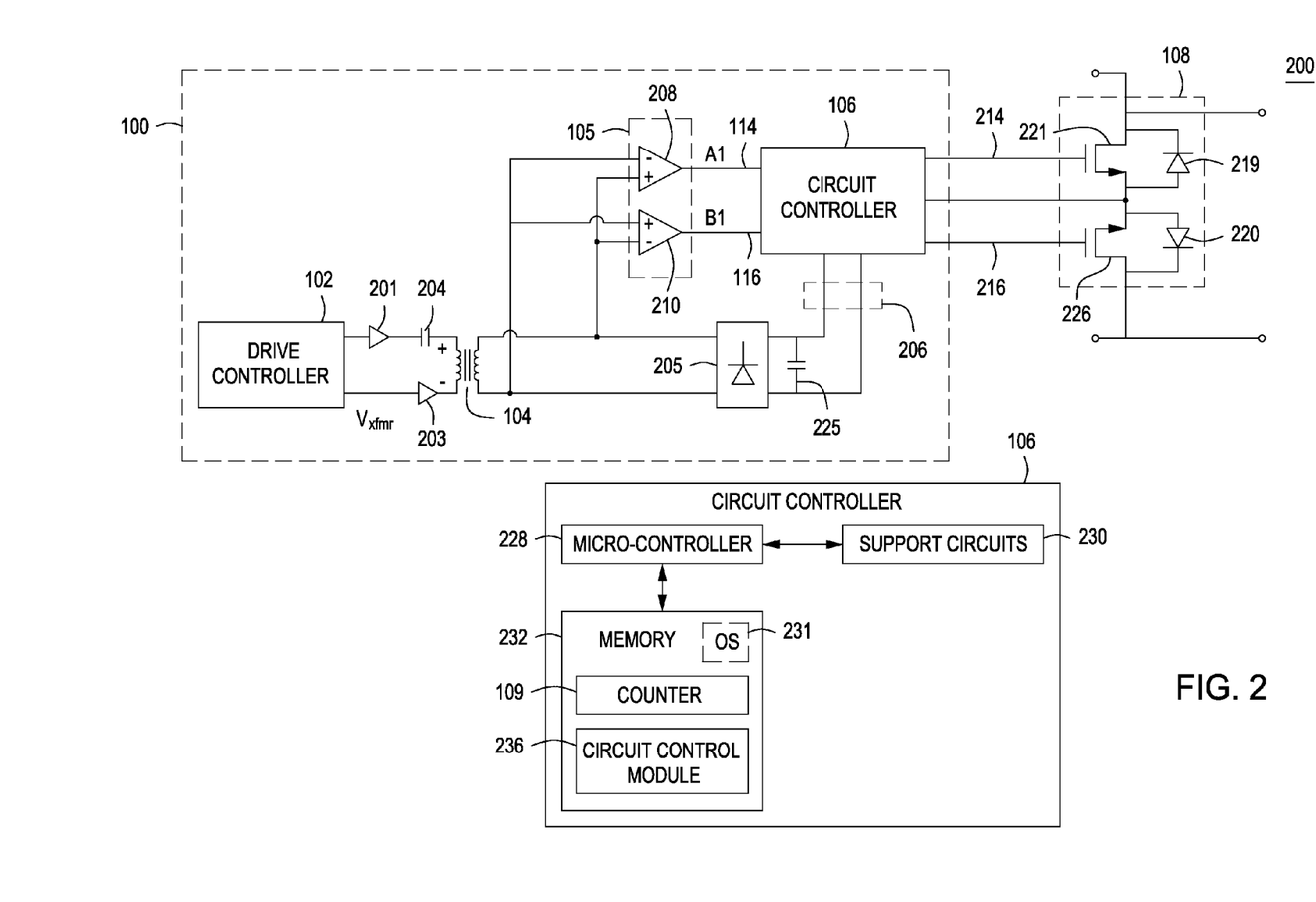
FIG. 2 is an implementation of the apparatus of FIG. 1 as a circuit in accordance with at least one embodiment of the invention.

FIG. 2 depicts an implementation of the apparatus 100 as a circuit 200 in accordance with at least one embodiment of the invention. According to an exemplary embodiment, the isolation barrier 104 is a transformer (i.e., transformer 104) that is coupled on its primary side across a drive controller 102 by buffers 201 and 203 and driven by a full-bridge transformer voltage waveform ($V_{xfmr}$) generated by the drive controller 102. The full-bridge waveform can apply positive input voltage, zero voltage, or negative input voltage across the transformer 104; in some embodiments, the full-bridge waveform may be on the order of 8 volts. The transformer 104 is coupled on its secondary side across a rectifier 205; the transformer 104 and the rectifier 205 act as a standard, unregulated DC-DC converter. The rectifier 205 is coupled across a capacitor 225 and further to the circuit controller 106, and rectifies the signal from drive controller 102 to obtain power 206 that drives the circuit controller 106. In an exemplary embodiment, rectifier 205 is a bridge rectifier for rectifying the bipolar $V_{xfmr}$ waveform (e.g., full wave rectification) to provide power 206.

Comparators 208 and 210 are coupled to the output of the transformer 104 through transmission lines 207 and 209. Transmission line 209 couples a first terminal of the transformer secondary winding to a non-inverting input of the comparator 208 and to an inverting input of the comparator 210, while transmission line 207 couples a second terminal of the transformer secondary winding to an inverting input of the comparator 208 and to a non-inverting input of the comparator 210. The outputs of comparators 208 and 210 are coupled as inputs to the circuit controller 106, where comparator 208 couples a signal A1 (i.e., the data signal 114 of FIG. 1) to the circuit controller 106, and comparator 210 couples a signal B1 (i.e., the data signal 116 of FIG. 1) to the circuit controller 106. The comparators 208 and 210 are one embodiment of the filter 105.

The circuit controller 106 outputs a demodulated first data signal 214 and a demodulated second data signal 216 to the circuit 108 coupled to the circuit controller 106. In this exemplary embodiment, circuit 108 is a 4Q switch comprised of two back-to-back n-type metal-oxide-semiconductor field effect transistor (MOSFET) switches 221 and 226 coupled respectively across diodes 219 and 220 (e.g., body diodes), where the source terminals of the switches 221 and 226 are coupled to one another; alternatively, the switches 221 and 226 may be different types of field effect transistors (FETs). The signals 214 and 216 are coupled to the switches 221 and 226, respectively, for driving the switches 221 and 226. In other exemplary embodiments, the circuit controller 106 may be coupled to other types of circuits for controlling such circuits.

The circuit controller 106 may be comprised of hardware, software, or a combination thereof and comprises a microcontroller 228 coupled to support circuits 230 and memory 232. The memory 232 may comprise random access memory, read only memory, removable disk memory, flash memory, and various combinations of these types of memory. The memory 232 is sometimes referred to as main memory and may, in part, be used as cache memory or buffer memory. The memory 232 may store, if necessary, an operating system (OS) 231 of the circuit controller 106 that can be supported by the microcontroller capabilities.

The memory 232 stores various forms of application software, such as a circuit control module 236 for controlling the circuit 108, and the demodulator 109. In an exemplary embodiment of the present invention, the demodulator 109 may be implemented as a simple counter, where each pulse of signal B1 increments the counter and signal A1 resets the counter. The number of pulses on signal B1 counted over one or more clock cycles forms one or more data characters that may then interpreted and used to control the circuit 108. In some embodiments, the demodulator 109 may interpret such data and determine the corresponding control instructions for operating the circuit 108; alternatively, the circuit control module 236 or other logic may interpret the data characters obtained from signal B1. The first and second data signals 214 and 216 are thus generated based on the different types of data transmitted by signals A1 and B1 to drive the switches 221 and 226, respectively. The memory 232 may additionally store other application software and/or one or more databases for storing data, such as data for interpreting the data characters derived from signal B1.

The microcontroller 228 may be one or more of many commercially available microcontrollers, microprocessors, processors, application specific integrated circuits (ASIC), and the like, and/or combinations thereof, configured to execute non-transient software instructions to perform various tasks in accordance with the present invention. In one or more embodiments, the microcontroller 228 may comprise internal memory for storing controller firmware that, when executed, provides the circuit controller functionality, for example as previously described and further described below with respect to FIG. 4. The support circuits 230 comprise well known circuits that facilitate the operation of the microcontroller 228 including, but not limited to, clock circuits, cache, power supplies, input/output circuits, indicators, sensors, and/or the like. The circuit controller 106 may be implemented using a general purpose computer that, when executing particular software, becomes a specific purpose computer for performing various embodiments of the present invention.

The power 206 from the drive controller 102 drives the circuit controller 106 which provides gate signals to switches 221 and 226 of the circuit 108. The comparators 208 and 210 are coupled to the transformer secondary winding such that the inputs to the comparators 208 and 210 are essentially the full-bridge transformer voltage waveform $V_{xfmr}$ and $V_{xfmr}$ with a flipped polarity, respectively. As such, the signal A1 generated by comparator 208 is the positive component of the waveform $V_{xfmr}$, and the signal B1 generated by the comparator 210 is the inverted negative component of the waveform $V_{xfmr}$.

Signal A1 provides low-latency timing information for circuit 108 (e.g., for driving the switches 221 and 226) as well as a clock/clock reset for circuit controller 106 (e.g., the demodulator 109 may be implemented as a counter that is reset by the signal A1). Signal B1 provides data for controlling the circuit 108 circuit 108; such data may be lower speed data than that transmitted by signal A1. In exemplary embodiments of the present invention, the data transmitted by signal B1 is one-bit data, two-bit data, binary data, and the like, that may define a mode for operating the circuit 108. For example, the signal B1 may specify whether either of the switches 221 and 226 can be held statically on for a time period while the remaining switch is driven by the signal A1; in some embodiments, such operating mode data may be updated at a rate of 60 Hz. In exemplary embodiments of the present invention, comparators 208 and 210 are Schmitt triggers, and the comparators 208, 210, the circuit controller 106, and the rectifier 205 reside on the same chip.

DC capacitor 225, coupled across the output of rectifier 205, is a bypass capacitor for the isolated driver supply voltage. In some embodiments, a DC blocking capacitor, such as capacitor 204, may be coupled in series with the primary winding of the transformer 104 to prevent saturation of the transformer core when the signals A1 and B1 are not equal in area. When the signals A1 and B1 are equal in area, intrinsic resistance in the circuit generally ensures that the core of the transformer 104 does not become saturated.

During operation of a device comprising the 4Q switch 108, there will be some voltage across the 4Q switch 108. Depending on whether the switches 221 and 226 in the 4Q switch 108 are opened or closed, current will or will not flow through them. The circuit controller 106 turns the switches 221 and 226 on and off based on the signals A1 and B1, where signal A1 may provide timing data and signal B1 may provide control data for determining an operating mode of the circuit 108. For example, during some periods, one of the switches (e.g., 221) may remain on all the time ("statically on") while the other switch (e.g., 226) turns on and off at a certain rate ("actively driven"). The signal B1 may provide operating mode data that indicates which, if any, of the switches 221 and 226 are to be held statically on while the other switch is actively driven. For example, in some embodiments, the 4Q switch 108 may be one of two 4Q switches that form a half-bridge circuit. Given a certain polarity of the half-bridge, one or more of the 4Q switch transistors not capable of blocking the polarity may be held statically on while the other 4Q switch transistors that are capable of blocking the polarity are dynamically driven. For example, when a positive voltage exists across the 4Q switches, only two of the four quadrants are utilized, i.e., two quadrants are constantly on, thereby reducing gate drive losses. Control data provided by the signal B1 may define which switches are to remain statically on and which switches are to be actively driven; e.g., switch 221 may be held statically on while switch 226 is driven on/off by the signal A1.

In some embodiments, the signal B1 may transmit a "0" bit to indicate that the switch 221 is to remain statically on while the switch 226 is actively driven, and a "1" bit to indicate that the switch 226 is to remain statically on while the switch 221 is actively driven. If a switch 221 or 226 is to be actively driven during a period, signal A1 indicates the corresponding timing (e.g., the rising edge of A1 indicates the turn-on for the switch, and when A1 is low the switch is turned off).

According to another exemplary embodiment, the signal B1 transmits character data such as two-bit character data 00, 01, 10, 11. Signal B1 increments a counter (e.g., of the demodulator 109) and the tick of signal A1 resets that counter, allowing for such characters to be transmitted. For example, a single pulse on the signal B1 during a clock cycle may correspond to the character "00", two pulses during a clock cycle may correspond to the character "01", three pulses during a clock cycle may correspond to the character "10", and four pulses during a clock cycle may correspond to the character "11". In other exemplary embodiments, more complex character data may be transmitted via the signal B1. For example, the signal B1 may transmit a single bit every clock cycle as clocked by the signal A1, and the bits over multiple clock cycles are then used to form a data character. The transmitted data characters may then be interpreted (e.g., by the demodulator 109 or the circuit control module 236) as circuit control instructions.

Figure 3:
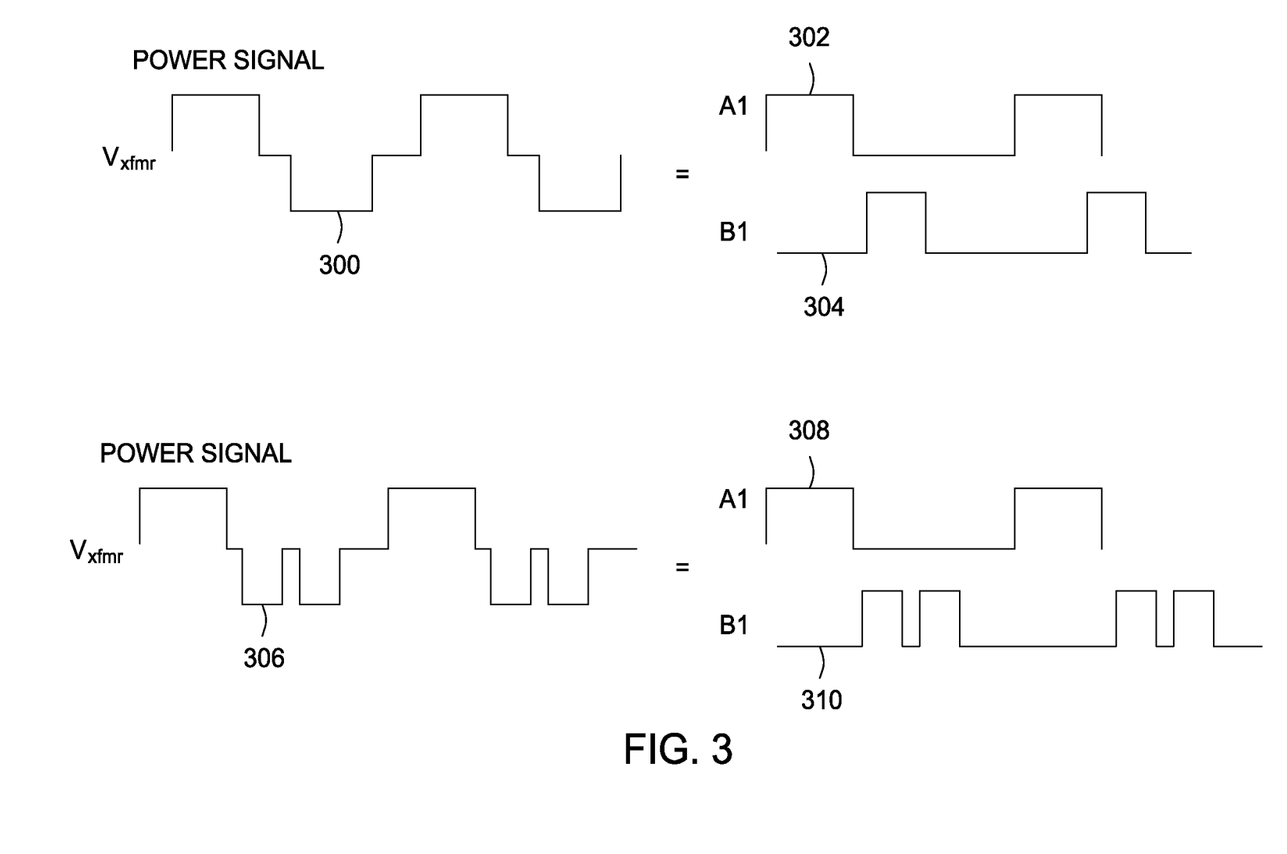
FIG. 3 is depicts exemplary waveforms for transmitting combined power, control and data through an isolation barrier in accordance with at least one embodiment of the invention.

FIG. 3 depicts exemplary waveforms 300 and 306 for transmitting combined power, control and data through an isolation barrier in accordance with at least one embodiment of the present invention. Waveforms 300 and 306 are examples of the waveform $V_{xfmr}$ generated by the drive controller 102 and used to run the circuit controller 106 to drive the circuit 108.

Waveform 300 is split by the filter 105 (e.g., comparators 208 and 210) into two signals, signal 302 ("A1") and signal 304 ("B1"). Signal 302 is the positive component of the waveform 300 and signal 304 is the inverted negative component of the waveform 300. Signals 302 and 304 are one embodiment of the signals A1 and B1 previously described. In general, the waveform 300 is generated such that the total area of signal 302 and signal 304 are equal to prevent a DC voltage from being applied across the transformer 104 and causing the magnetizing current to increasingly rise until saturation of the transformer 104 is reached and the transformer 104 stops functioning. In certain embodiments where the areas of signals 302 and 304 are not equal, a DC blocking capacitor such as capacitor 204 is used to prevent saturation of the transformer 104.

Signal 304 carries control mode data to determine whether, for example, switch 221 or 226 from FIG. 2 should remain statically on while the other switch is actively driven. Signal 302 also is capable of indicating that both or neither switch 221 or 226 are to be statically on. For example, the single pulse of signal 304 depicted as occurring during the single cycle of signal 302 may indicate 00, while additional numbers of pulses on signal 304 during a single cycle of signal 302 may be interested as the data characters 01, 10 or 11.

For example, waveform 306 is split by the filter 105 into the two signals 308 ("A1") and 310 ("B1"), where two pulses of signal 310 occur during a single cycle of signal 308 and may be interpreted as the data character "01". The circuit controller 106 may be configured to read "00" as "neither 221 nor 226 are statically on," "01" as "221 not statically on; 226 statically on", etc. If the signal 310 is interpreted as the data character "01", then switch 226 is held statically on while 221 is switched on/off at a rate determined by signal 308. In addition, signal 308 also resets the counting of signal 310 pulses. In some alternatively, signal 310 may transmit a single bit of data each clock cycle and the data from two successive clock cycles forms the 2-bit character.

In addition to providing such timing and control data, the waveforms 300 and 306 also provide power for powering the circuit controller 106. As depicted in FIG. 2, the waveform 300 (or the waveform 306) is coupled to the primary side of the transformer 104; the resulting waveform on the secondary side of the transformer 104 is then rectified by the rectifier 205 and coupled via capacitor 225 to the circuit controller 106 for providing power to the circuit controller 106.

Figure 4:
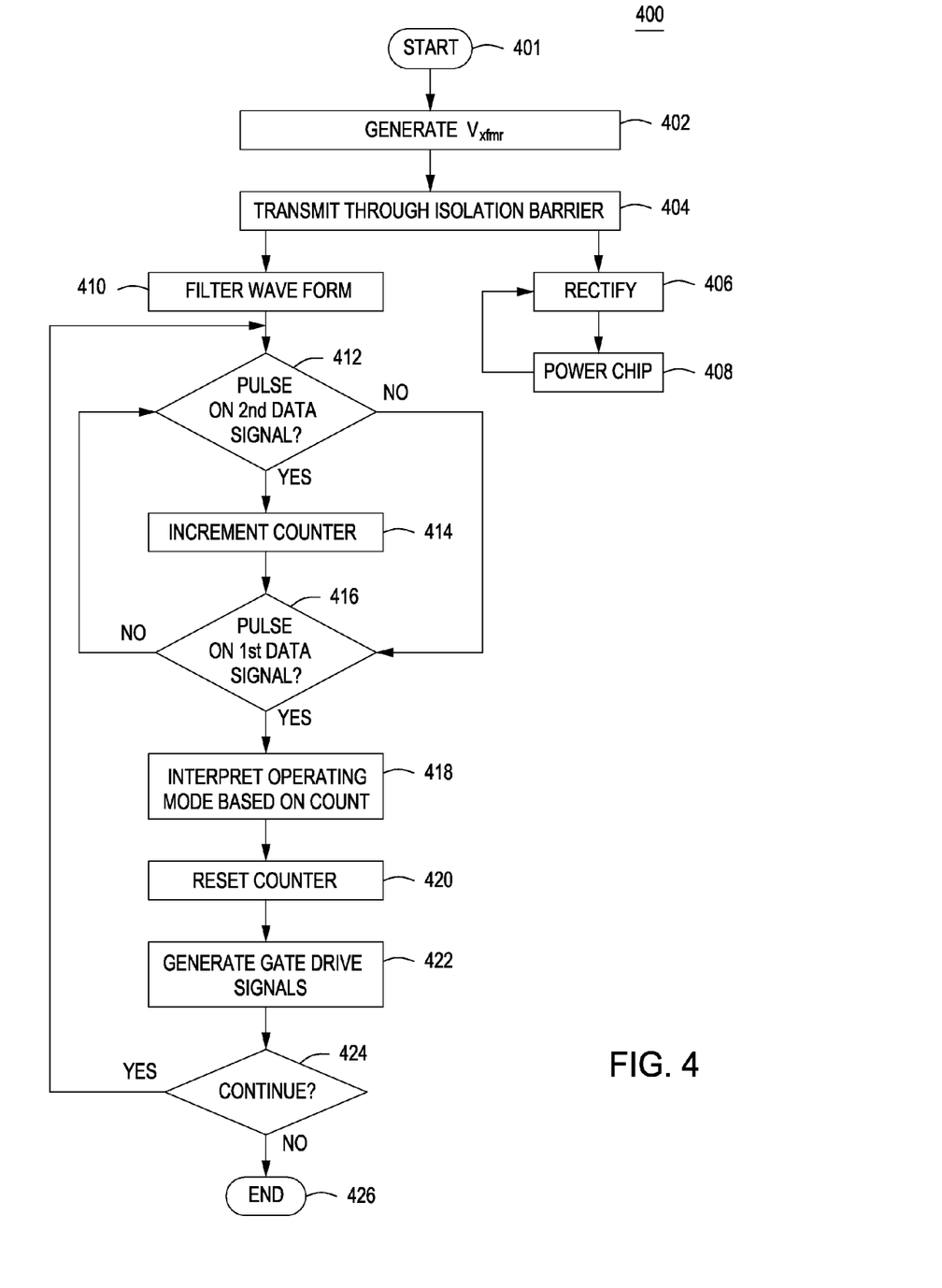
FIG. 4 is a flow diagram showing a method for transmitting combined power, control and data through an isolation barrier in accordance with at least one embodiment of the invention.

FIG. 4 depicts a flow diagram of method 400 for transmitting combined power and multiple data types through an isolation barrier according to at least one of the embodiments of the present invention. The method 400 begins at step 401 and proceeds to step 402. At step 402, a waveform is generated that comprises a plurality of different types of data for operating a circuit as well as sufficient power level for operating a circuit controller (e.g., a power, data and control waveform). The waveform may be a full-bridge transformer voltage waveform such as $V_{xfmr}$ generated by the drive controller 102 and depicted in FIG. 3 as waveform 300 or waveform 306. At step 404, the power, data and control waveform is transmitted across the isolation barrier, such as across the transformer 104 from the low voltage side to the high voltage side. The resulting waveform is then rectified at step 406 (e.g., by rectifier 205) and at step 408 powers a circuit controller, such as the circuit controller 106.

At step 410, the power, data and control waveform, after being transmitted across the isolation barrier, is filtered to obtain first and second data signals that comprise different types of data for operating a circuit, such as the signals A1 and B1 previously described. In some embodiments, comparators such as comparators 208 and 210 may be used to generate the first and second data signals.

At step 412, a determination is made whether the second data signal comprises a pulse. If it is determined at step 412 that there is a pulse on the second data signal, then the method 400 moves to step 414 where a single pulse is recorded; for example the demodulator 109 may be implemented as a counter that is incremented. The method 400 then proceeds to step 416. If at step 412 it is determined that there is no pulse on the second data signal, then the method 400 proceeds to step 416.

At step 416, it is determined whether there is a pulse on the first data signal. If at step 416 it is determined that there is no pulse on the first data signal, the method 400 returns to step 412. If at step 416 it is determined that there is a pulse on the first data signal, the method 400 moves on to step 418.

At step 418, the pulses counted from the second data signal are interpreted to obtain data pertaining to operation of a circuit; in one embodiment, the number of pulses is interpreted by the demodulator 109 to define an operating mode of the 4Q switch 108 as previously described. Alternatively, the number of pulses counted may be used to determine one or more different types of data. In certain embodiments, the pulses counted from the second data signal may be part of a complex control signal generated over multiple clock cycles defined by the first data signal, where the complex control signal is interpreted following an appropriate number of clock cycles.

The method 400 proceeds to step 420. At step 420, the counter is reset and a new clock cycle begins. At step 422, gate drive signals are generated by the circuit controller based on the operating mode determined from step 418 and the timing of the first data signal. The method 400 proceeds to step 424, where a determination is made whether to continue operating. If it is determined at step 424 to continue operating, the method 400 returns to step 412. If it is determined at step 424 that operation won't be continued, the method 400 ends at step 426.

Figure 5:
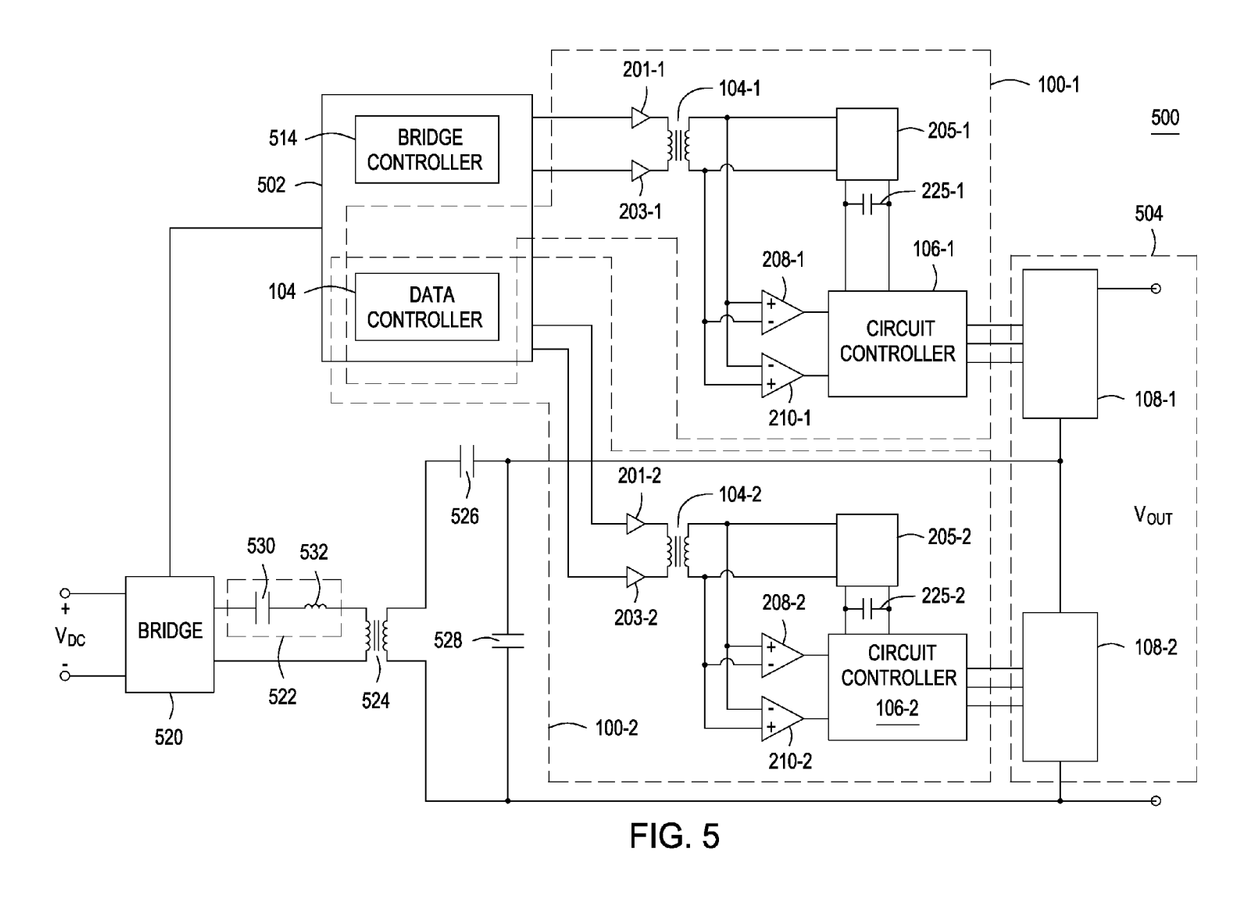
FIG. 5 depicts a functional block diagram of a resonant converter comprising the apparatus from FIG. 1 for transmitting combined power, control and data through an isolation barrier in accordance with at least one embodiment of the invention.

FIG. 5 depicts a functional block diagram of a resonant converter 500 comprising the circuit 100 for transmitting combined power, control and data through an isolation barrier in accordance with at least one embodiment of the invention.

The resonant converter 500 ("converter 500") comprises a bridge 520 coupled in series to a resonant circuit 522. The bridge 520 may be a full H-bridge comprising multiple switches (e.g., MOSFETS). The resonant circuit 522 comprises a capacitor 530 coupled in series with an inductor 532, although in other embodiments the resonant circuit 522 may be a different type of resonant circuit and/or coupled in a different topology within the converter 500.

The primary side of a transformer 524 is coupled across the output of the resonant circuit 522 and the bridge 520. The secondary side of the transformer 524 is coupled across a series combination of capacitors 526 and 528. A first 4Q switch 108-1 has a first terminal coupled to a first output terminal of the converter 500 and a second terminal coupled between the capacitors 526 and 528. A second 4Q switch 108-2 has a first terminal also coupled between the capacitors 526 and 528, and a second terminal coupled to a second output terminal of the converter 500. The first and second 4Q switches 108-1 and 108-2 are part of a cycloconverter 504 for generating an AC output from the converter 500. In some embodiments, the converter 500 generates a single-phase AC output; in other embodiments, the converter 500 comprises additional 4Q switches for generating a split-phase or a three-phase AC output. One example of a resonant converter that may employ the present invention may be found in co-pending, commonly assigned U.S. patent application Ser. No. 13/342,368, entitled "Method and Apparatus for Resonant Power Conversion" and filed Jan. 3, 2012, which is herein incorporated in its entirety by reference.

In an exemplary embodiment, a controller 502 comprises a bridge comprises a bridge controller 514 coupled to the bridge 520 for controlling switches of the bridge 520. The bridge controller 514 may receive one or more inputs (not shown), for example one or more inputs indicative of a voltage on an AC line coupled at the output of the converter 500. The controller 502 further comprises a drive controller 102, previously described with respect to FIGS. 1 and 2.

A first apparatus 100-1 is coupled to the 4Q switch 108-1, and a second apparatus 100-2 is coupled to the 4Q switch 108-2. The first and second apparatuses 100-1 and 100-2 each comprise the components configured as described with respect to FIG. 2. In some embodiments, such as the embodiment depicted in FIG. 5, the drive controller 102 is part of both apparatuses 100-1 and 100-2; in other embodiments, the apparatuses 100-1 and 100-2 may each comprise a separate drive controller. In still other embodiments, the drive controller 102 may be separate from the controller 502, or the apparatuses 100-1 and 100-2 may be part of the controller 502.

The converter 500 converts a DC input at the bridge 520 to an AC output via the cycloconverter 504. As previously described, the drive controller 102 generates, for each of the apparatuses 100-1 and 100-2, a waveform that provides power as well a plurality of types of data across an isolation barrier (e.g., transformer 104-1 or 104-2) to the corresponding circuit controller 106-1/106-2 for driving the corresponding 4Q switch 108-1/108-2. The switch controllers 106-1 and 106-2 each receive power via a corresponding rectifier 205-1 and 205-2. Further, the switch controllers 106-1/106-2 each receive first data signals from a corresponding comparator 208-1/208-2, and second data signals from a corresponding comparator 210-1/210-2. The first data signal is a low-latency signal providing timing data and drive control of the corresponding 4Q switch 108-1/108-2 (e.g., the signal A1 previously described), and the second data signal may be demodulated to obtain data for operating the 4Q switch, such as mode control data (e.g., the signal B1 previously described). Such mode control data may identify one or more modes for operating the corresponding 4Q switch 108-1/108-2, for example by identifying one or more switches that may be held statically on over a time period as previously described.

In some embodiments, a zero-voltage detection apparatus may be used along with the present invention for operating switches of the cycloconverter 504. For example, a zero-voltage detection apparatus may be coupled across each of the 4Q switches 108 for indicating when the voltage across the corresponding 4Q switch 108 is at or proximate zero volts in order to switch with fewer switching losses. One example of such a zero-voltage detection apparatus may be found in co-pending, commonly assigned U.S. patent application Ser. No. 13/668,970, entitled "Method and Apparatus for Detecting a Zero Voltage Condition across Four Quadrant Switches" and filed Nov. 5, 2012, which is herein incorporated in its entirety by reference.

Figure 6:
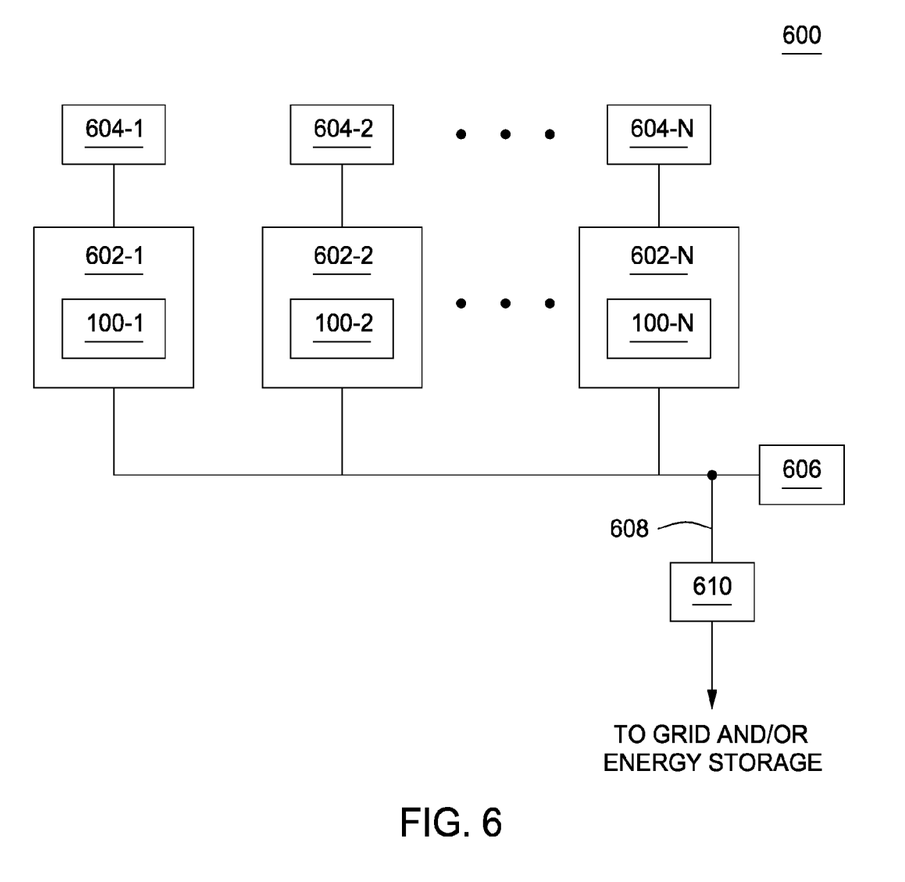
FIG. 6 is a block diagram of a system 600 for power conversion in accordance with one or more embodiments of the present invention.

FIG. 6 is a block diagram of a system 600 for power conversion in accordance with one or more embodiments of the present invention. This diagram only portrays one variation of the myriad of possible system configurations and devices that may utilize the present invention. The present invention can be utilized in a variety of systems or devices for transmitting combined power, control and data through an isolation barrier.

The system 600 comprises a plurality of power converters 602-1, 602-2 . . . 602-N, collectively referred to as power converters 602; a plurality of DC power sources 604-1, 604-2 . . . 604-N, collectively referred to as DC power sources 604; a system controller 606; a bus 608; and a load center 610. The DC power sources 604 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 602-1, 602-2 . . . 602-N is coupled to a single DC power source 604-1, 604-2 . . . 604-N, respectively; in some alternative embodiments, multiple DC power sources 604 may be coupled to a single power converter 602, for example a single centralized power converter 602. Each of the power converters 602 comprises an apparatus 100 (e.g., the power converters 602-1, 602-2 . . . 602-N comprise the apparatuses 100-1, 100-2 . . . 100-N, respectively) utilized during power conversion. In some embodiments, the power converters 602 may generate a single phase AC power output; in other embodiments, the power converter 602 may generate a split-phase or three-phase AC output.

The power converters 602 are coupled to the system controller 606 via the bus 608. The system controller 606 is capable of communicating with the power converters 602 by wireless and/or wired communication for providing operative control of the power converters 602. The power converters 602 are further coupled to the load center 610 via the bus 608. In some embodiments, such as the embodiment depicted in FIG. 6, the power converters 602 are coupled to one another in parallel; in other embodiments, the power converters 602 may be coupled to one another in series or in a combination of series and parallel.

The power converters 602 are each capable of converting the received DC power to AC power, although in other embodiments the power converters may convert the received DC power to a second DC power, or may receive an AC input and convert the received input to a DC output. The power converters 602 couple the generated output power to the load center 610 via the bus 608. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 602 convert the DC input power to AC power that is commercial power grid compliant and couple the AC power to the commercial power grid via the load center 610.

In some alternative embodiments, the power converters 602 may be DC-DC power converters; in other alternative embodiments, the power converters 602 may receive an AC input and be AC-AC converters (e.g., AC-AC matrix converters). In certain embodiments, the system 600 may be a serially connected micro-inverter (SCMI) system, for example with SCMI redundancy management.

Each of the apparatuses 100 transmits a combination of power and multiples types of data (e.g., combined power, control and data) through an isolation barrier as previously described. Each of the apparatuses 100 may control a corresponding 4Q switch (e.g., 4Q switch 108); in some embodiments, one or more of the power converters 602 may comprise additional apparatuses 100, for example for controlling additional 4Q switches.

The foregoing description of embodiments of the invention comprises a number of elements, devices, circuits and/or assemblies that perform various functions as described. For example an isolation barrier is one example of a means for providing electrical isolation, a drive controller is one example of a means for generating a waveform comprising a plurality of data signals for transmitting different types of data, and a circuit controller is one example of a means for controlling a circuit based on the plurality of data signals. These elements, devices, circuits, and/or assemblies are exemplary implementations of means for performing their respectively described functions The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof.

The invention claimed is:

1. Apparatus for transmitting combined power and data, comprising:
    an isolation barrier;
    a drive controller for generating a first waveform comprising a plurality of data signals for transmitting different types of data, wherein the drive controller couples the first waveform to a first side of the isolation barrier to produce a second waveform on a second side of the isolation barrier;
    a circuit controller coupled to the second side of the isolation barrier, wherein the circuit controller is powered by the second waveform, and wherein the circuit controller controls a circuit based on the plurality of data signals; and a filter coupled to the second side of the isolation barrier and to the circuit controller, wherein the filter filters the second waveform to obtain a first data signal and a second data signal, and couples the first and the second data signals to the circuit controller.

2. The apparatus of claim 1, wherein the first data signal is a positive component of the second waveform and the second data signal is an inverted negative component of the second waveform.

3. The apparatus of claim 1, wherein the first data signal provides timing data for operating at least one switch of the circuit, and the second data signal provides control data for determining at least one operating mode of the circuit.

4. The apparatus of claim 1, wherein the first data signal provides a clock for demodulating the second data signal.

5. The apparatus of claim 1, further comprising a counter, wherein each pulse of the second data signal increments the counter and each pulse of the first data signal resets the counter.

6. The apparatus of claim 5, wherein a number of pulses counted by the counter during a single cycle of the first data signal are used to form an n-bit data character used to determine at least one operating mode of the circuit.

7. The apparatus of claim 6, wherein the at least one operating mode identifies which switches of the circuit to hold statically on while actively driving other switches of the circuit.

8. The apparatus of claim 6, wherein the n-bit data character is formed over a plurality of cycles of the first data signal.

9. A method for transmitting combined power and data, comprising:
   generating a first waveform comprising a plurality of data signals for transmitting different types of data;
   coupling the first waveform to a first side of an isolation barrier to produce a second waveform on a second side of the isolation barrier;
   powering a circuit controller by the second waveform;
   controlling a circuit based on the plurality of data signals;
   filtering the second waveform to obtain a first data signal and a second data signal; and
   coupling the first and the second data signals to the circuit controller for controlling the circuit.

10. The method of claim 9, wherein the first data signal is a positive component of the second waveform and the second data signal is an inverted negative component of the second waveform.

11. The method of claim 9, wherein the first data signal provides timing data for operating at least one switch of the circuit, and the second data signal provides control data for determining at least one operating mode of the circuit.

12. The method of claim 9, further comprising demodulating the second data signal by using the first data signal as a clock.

13. The method of claim 9, further comprising counting a number of pulses of the second data signal that occur during each cycle of the first data signal.

14. The method of claim 13, further comprising:
   forming an n-bit data character based on pulses of the second data signal that occur during a single cycle of the first data signal; and
   determining at least one operating mode of the circuit based on the n-bit data character.

15. The method of claim 14, wherein the at least one operating mode identifies which switches of the circuit to hold statically on while actively driving other switches of the circuit.

16. The method of claim 14, wherein the n-bit data character is formed over a plurality of cycles of the first data signal.

17. A system for transmitting combined power and data, comprising:
   a cycloconverter comprising a four quadrant (4Q) switch;
   an isolation barrier;
   a drive controller for generating a first waveform comprising a plurality of data signals for transmitting different types of data, wherein the drive controller couples the first waveform to a first side of the isolation barrier to produce a second waveform on a second side of the isolation barrier; and
   a circuit controller coupled to the second side of the isolation barrier, wherein the circuit controller is powered by the second waveform, and wherein the circuit controller controls the 4Q switch based on the plurality of data signals.

18. The system of claim 17, further comprising a filter coupled to the second side of the isolation barrier and to the circuit controller; wherein the filter (i) filters the second waveform to obtain a first data signal and a second data signal and (ii) couples the first and the second data signals to the circuit controller; and wherein the first data signal provides timing data for operating switches of the 4Q switch and a clock for demodulating the second data signal to obtain an n-bit data character; and wherein the n-bit data character identifies at least one operating mode of the 4Q switch.

* * * * *